M. AND J. P. GILSON.
CONCRETE MIXER.
APPLICATION FILED AUG. 13, 1919.
Reissued Jan. 27, 1920.
14,795.
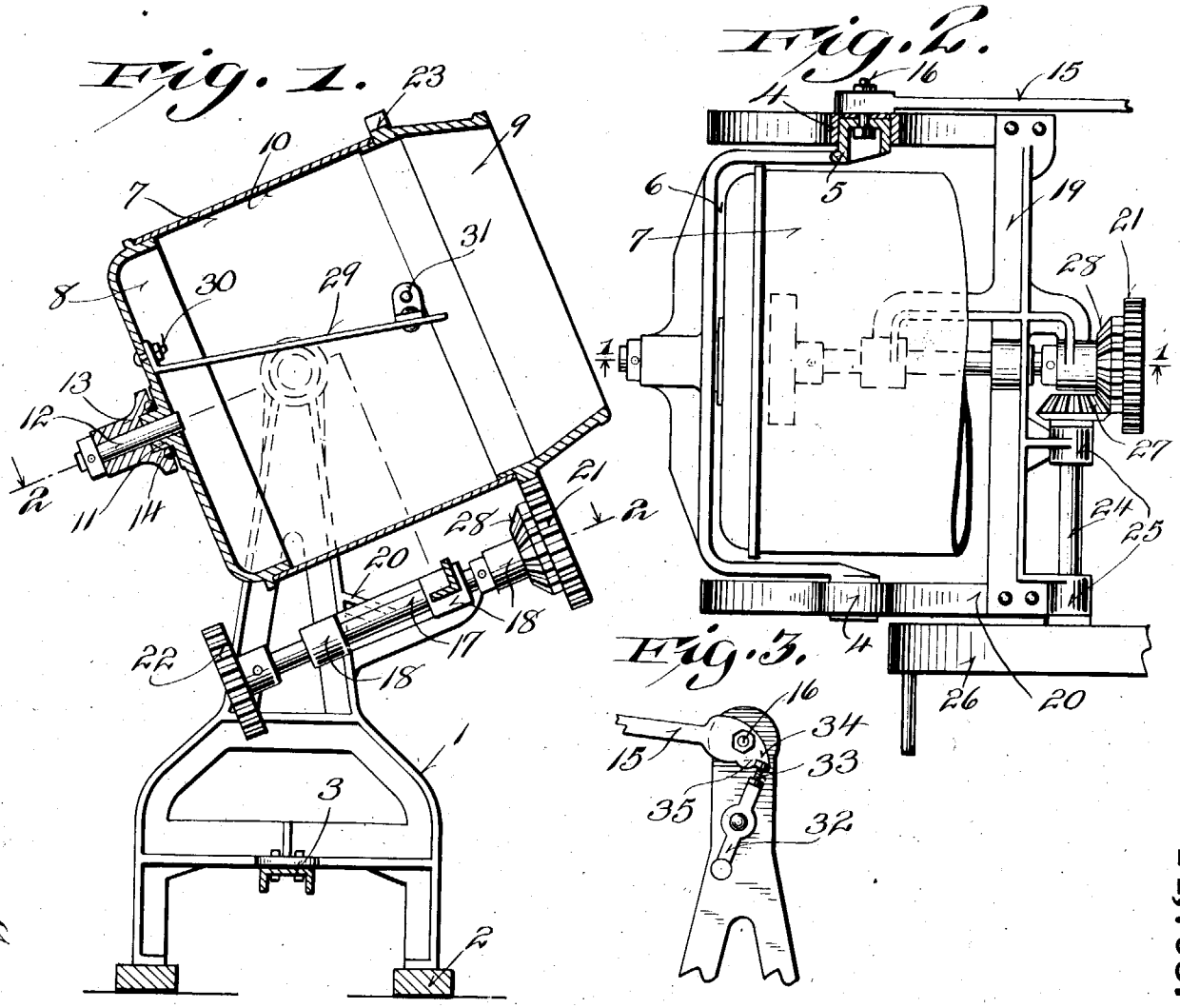
Witness:
T. P. Britt
Inventors:
John P. Gilson
Michael Gilson
By Young & Young
Attorneys.

UNITED STATES PATENT OFFICE.

MICHAEL GILSON AND JOHN P. GILSON, OF FREDONIA, WISCONSIN.

CONCRETE-MIXER.

14,795. Specification of Reissued Letters Patent. Reissued Jan. 27, 1920.

Original No. 1,237,028, dated August 14, 1917, Serial No. 146,682, filed February 5, 1917. Application for reissue filed August 13, 1919. Serial No. 317,390.

*To all whom it may concern:*

Be it known that we, MICHAEL GILSON and JOHN P. GILSON, both citizens of the United States, and residents of Fredonia, in the county of Ozaukee and State of Wisconsin, have invented certain new and useful Improvements in Concrete-Mixers; and we do hereby declare that the following is a full, clear, and exact description thereof.

Our invention pertains to new and useful improvements in mixing machines, particularly those which are adapted for mixing batches of concrete.

Heretofore it has been more or less difficult in mixers of this type to efficiently expel the contents from the mixing drum after the same has been thoroughly commingled.

It is therefore the primary object of the present invention to provide an arrangement for quickly and thoroughly discharging the mixed contents from the mixing drum, this being accomplished by rotating said drum when in a dumping position in a direction reverse to the direction of rotation when in the loading position.

An additional object is to provide mixing blades fixed to the interior of the mixing drum in such a position that they will aid in expelling the mixed contents when the mixing drum is in a dumping position and rotating in a direction reverse to the direction of rotation when in a normal mixing or loading position.

A further object is to provide a simply constructed mixing machine having a tiltable mixing drum in connection with a drive shaft continuously rotatable in one direction and means for tilting the drum to either loading or dumping position and engaging the same with drive means on said shaft, whereby said drum will rotate in one direction when in the first mentioned position and in a reverse direction when in the other position.

It is also an object of our invention to simplify and strengthen the structure and improve the efficiency of mixers of this general type, and to distribute the load strain of the mixing drum both when in operative mixing or loading position and in dumping position so as to relieve the bearing connection between the supporting yoke and said drum.

With the foregoing and other objects and advantages in view, the invention resides more particularly in the novel combination, formation and arrangement of parts which will be hereinafter described and claimed, and shown in the accompanying drawing wherein:

Figure 1 represents a vertical sectional view taken through a concrete mixer constructed in accordance with our invention, said section being substantially on the plane of the line 1—1 of Fig. 2.

Fig. 2 is a horizontal sectional view substantially through the supporting frame of the drum and on the line 2—2 of Fig. 1, and Fig. 3 is a detail view showing the adjustable means for holding the drum in meshing engagement with its driving gear.

In the illustrated embodiment of the invention which depicts one conventional form thereof, it will be seen that the machine consists essentially of a supporting frame, a mixing drum, and means for revolving said drum in loading and dumping positions. The supporting frame comprises skeleton end standards 1 having their feet connected by a pair of spaced skid beams 2 and their intermediate portions by a channel beam 3, the same being located between the feet as clearly shown in Fig. 1. The upper ends of the standards 1 terminate in bearings 4 which journally receive trunnions 5 formed on the ends of the arms of a U-shape supporting yoke 6. The trunnions are preferably in the form of sleeves formed integrally with the yoke arms.

The mixing drum 7 is mounted for axial rotation between the arms of said yoke 6 and preferably consists of a pan-shaped bottom casting 8 and an annular mouth casting 9, having its outer portion taperingly reduced to facilitate discharge, these castings being connected by a cylindrical wall 10. The center of the bottom casting 8 is provided with an outwardly projecting cylindrical boss 11 which seats in a socket formed in the bight of the yoke 6 and has a stub shaft 12 extending therefrom, the same being journally mounted in a bearing opening of a bearing sleeve 13 formed integrally with said bight of the yoke 6 (see Fig. 1). Bearing balls 14 are interposed between the boss 11 and the adjacent portion of the yoke to form an end thrust bearing.

As a result of this construction the mixing drum 7 is axially rotatable and vertically tiltable. The means for causing the tilting consists of an operating handle 15 secured by means of a bolt or the like 16 to one of the trunnions 5 as indicated in Fig. 2.

The means for axially rotating the drum includes a drive shaft 17 journaled in bearings 18 carried by a transverse beam 19 that is secured to forwardly extending supporting arms 20 preferably cast integrally with the standards 1. This shaft is positioned at an inclination to the horizontal for a purpose which will later be explained. On the outer end, that is to say the higher end, of the shaft 17 is secured a spur gear 21, while at the opposite end is keyed a second spur gear 22 of substantially the same size, these gears being spaced such a distance apart that their teeth will be engaged by the teeth of an annular gear ring 23 secured to the intermediate portion of the drum 7 when the latter is tilted to either its mixing and loading position or to its dumping position.

Continuous rotation of the drive shaft 17 in one direction is procured by means of a shaft 24 journaled in bearings 25 carried by by the beam 19, but at right angles to the other shaft 17, the outer end of said shaft 24 having a drive means such as the band wheel 26. The opposite end of the shaft 24 has a beveled gear 27 keyed thereto, the teeth of which mesh with the teeth of a beveled gear 28 fixed to the drive shaft 17.

The interior of the mixing drum 7 is provided with a plurality of mixing blades 29 one of which is rigidly secured as at 30 and 31 to the bottom casting 8 and cylindrical wall 10 respectively, the others being spaced about the interior of the drum and secured in the same manner. These mixing blades are so arranged with respect to the wall of the mixing drum and the axis of rotation of the latter that they will cause the concrete or other materials deposited in the drum to be thoroughly commingled when the same is rotated while in its mixing and loading position. On the other hand when the mixing drum is in a dumping position, and rotating in a direction the reverse of the direction of rotation when in its other position, the blades 29 will act to expel the commingled contents. In other words these mixing blades 29 are inclined at an angle to the direction of rotation of the drum so that when the drum is rotated in a loading or mixing position the contents will be directed toward the bottom thereof, whereas when the drum is in a dumping position and rotating in a reverse direction, the action of the blades will tend to expel the contents by directing the same toward the mouth.

Inasmuch as the mixing and loading position is the normal position of the mixing drum, means is provided for positively holding the teeth of the gear ring 23 in proper meshing engagement with the teeth of the gear 21. This means consists of a pawl 32 pivoted to one of the standards 1 and having an adjustable head 33 for engagement with a stop shoulder 34 formed on the operating or tilting handle 15 adjacent the pivot thereof as seen from Fig. 3. A lug 35 on said shoulder prevents inward slipping movement of the pawl. The adjustable head 33 of the pawl provides an arrangement whereby an exact meshing of the gear teeth may be insured, and the pivotal arrangement of said pawl allows the same to be readily shifted to permit movement of the drum to its dumping position.

The operation of the invention is substantially as follows: The mixing drum 7 is swung by means of the handle 15 to its loading and mixing position wherein the open end thereof will be located upwardly and the teeth of the gear ring 23 meshed with the teeth of the gear 21. Now, assuming that the various ingredients to be mixed have been deposited in the drum, revolution of the shaft 24 will impart rotation to the drive shaft 17 and in turn axially rotate said drum in such a direction that the mixing blades therein will aid the tumbling action given the materials in thoroughly agitating and commingling the same.

After the drum contents have been effectively mixed, the operating handle 15 is swung in a proper direction to tilt the drum through an arc of substantially 180 degrees, the gear teeth of the ring 23 thereby being disengaged from the teeth of the gear 21 and caused to mesh with the teeth of the gear 22 at the opposite end of the shaft 17 from said gear 21. It will be noted that the engagement between the gear ring 23 and gear 22 is diametrically opposite the point of engagement between said ring and the gear 21. Thus even though the shaft 17 is rotated in the same direction as previously mentioned, which is the case in practice, the drum 7 will be rotated while in a dumping position in a direction reverse of the direction of rotation in the normal position. These differences in direction of rotation will be observed in each case from the mouth end of the drum. Owing to this reverse direction of rotation the mixing blades 29 will have a tendency to expel the drum contents, thereby aiding the natural action of gravity.

By positioning the drive shaft 17 at an angle to the horizontal, the mixing drum will be caused to assume a proper inclination when in both of its two positions. That is to say when the drum is in loading and mixing position its mouth will be sufficiently raised to retain the contents therein, whereas when the same is in dumping position, its open end will permit ready expulsion of the contents. Furthermore the gears 21 and 22 are of such a diameter that the axis of rotation of the drum 7 will always be substantially parallel to the axis of rotation of the shaft 17.

We claim:

1. A mixer comprising a support, a mixing drum rotatably and tiltably mounted on said support, said drum being selectively movable to either loading or dumping position, means connected with the drum for rotating the same in one direction when in loading position to mix the contents and in the reverse direction when in dumping position to aid in expelling the mixed contents, and means operable at will for moving the drum from loading to dumping position and vice versa and simultaneously disengaging the same from said rotating means.

2. A mixer comprising a rotary, vertically tiltable drum, one end of said drum being open, a support for said drum, means for rotating the drum in one direction when its open end is disposed upwardly, means for rotating the drum in a reverse direction when said open end is disposed downwardly including a continuously rotatable shaft disposed substantially parallel to the axis of the drum, a pair of gear wheels on the shaft, peripheral gear teeth on the drum adapted to be selectively meshed with the gear teeth, and means for rotating said shaft.

3. A mixer comprising a horizontally rotatable drum support, a mixing drum having one end rotatably secured to the support, an inclined shaft journaled under the drum, a pair of gear wheels on the shaft, peripheral gear teeth on the mixing drum, adapted to selectively mesh with the gear wheels, and means for rotating said shaft.

4. A mixer comprising a support, a mixing drum rotatably secured therein, a shaft journaled under the drum substantially parallel to the axis thereof, and means carried by each end of the shaft for rotating the drum in one direction when in normal position and in reverse direction when in dumping position.

5. A mixer comprising, in combination, a pair of supporting standards, a mixing drum rotatably and vertically mounted between said standards, peripheral gear teeth on the drum, a forwardly extending bracket formed on each standard, a transverse beam carried by said brackets, transversely extending and alined arms formed on said beam, bearings in said arms, a shaft journaled in said bearings and extending substantially parallel to the axis of the drum, gear wheels mounted on the shaft and adapted to be selectively engaged by the peripheral teeth of the drum for revolving said drum in one direction when in normal position and in a reverse direction when in discharging position, a beveled gear fixed to said shaft and juxtaposed to the forward gear wheel thereon, laterally extending and transversely alined arms formed on said beam to one side of said other arms, a driven shaft journaled therein, and a beveled gear on the inner end of the last named shaft and in mesh with the beveled gear of the first shaft substantially as described.

In testimony that we claim the foregoing we have hereunto set our hands at Fredonia, in the county of Ozaukee and State of Wisconsin.

MICHAEL GILSON.
JOHN P. GILSON.